United States Patent
Kniffler et al.

(10) Patent No.: US 11,105,432 B2
(45) Date of Patent: Aug. 31, 2021

(54) FLUID SWITCHOVER DEVICE AND METHOD OF PRODUCING A FLUID SWITCHOVER DEVICE

(71) Applicant: Efficient Energy GmbH, Feldkirchen (DE)

(72) Inventors: Oliver Kniffler, Sauerlach (DE); Gerd Wings, Schwenningen (DE)

(73) Assignee: EFFICIENT ENERGY GMBH, Feldkirchen (DE)

( * ) Notice: Subject to any disclaimer, the term of this patent is extended or adjusted under 35 U.S.C. 154(b) by 0 days.

(21) Appl. No.: 16/800,247

(22) Filed: Feb. 25, 2020

(65) Prior Publication Data

US 2020/0191282 A1 Jun. 18, 2020

Related U.S. Application Data

(63) Continuation of application No. PCT/EP2018/072794, filed on Aug. 23, 2018.

(30) Foreign Application Priority Data

Aug. 29, 2017 (DE) .......................... 102017215082.3

(51) Int. Cl.
*F16K 11/074* (2006.01)
*F16K 11/052* (2006.01)
*F16K 27/00* (2006.01)

(52) U.S. Cl.
CPC ........ *F16K 11/074* (2013.01); *F16K 11/0525* (2013.01); *F16K 27/003* (2013.01)

(58) Field of Classification Search
CPC .............. F16K 11/074; F16K 11/0525; F16K 1/2261; F16K 1/2268; F16K 27/0218; F16K 1/222; Y10T 137/86839

(Continued)

(56) References Cited

U.S. PATENT DOCUMENTS 1,256,069 A   2/1918  Speckman
2,713,989 A   7/1955  Bryant
(Continued)

FOREIGN PATENT DOCUMENTS

AU        438274 B2   3/1971
CN      102052483 B   5/2011
(Continued)

OTHER PUBLICATIONS

Machine Translation of CN102052483, retrieved 1/14/20201 (Year: 2011).*
International Search Report dated Nov. 28, 2018 in PCT/EP2018/072794.
(Continued)

*Primary Examiner* — Michael R Reid
(74) *Attorney, Agent, or Firm* — McClure, Qualey & Rodack, LLP

(57) ABSTRACT

A fluid switchover device includes a housing having at least three ports leading into an interior space; a valve flap rotatably arranged within the housing and having a rotational axis that is mounted to the housing at first and second locations; and a circumferential seal mounted to the valve flap and having first and second evasion portions at first and second locations, respectively, which are configured to evade the rotational axis on the same side of the valve flap, and the valve flap is configured to slidingly engage a boundary of the interior space by means of the circumferential seal, so that at a first position of the valve flap, the first and second ports are connected, and the first and third ports are mutually sealed off, and in a second position, the first and third ports are connected, and the first and second ports are mutually sealed off.

16 Claims, 5 Drawing Sheets

(58) Field of Classification Search
USPC .................................................. 137/625.43
See application file for complete search history.

(56) References Cited

U.S. PATENT DOCUMENTS

| | | | |
|---|---|---|---|
| 3,111,300 A * | 11/1963 | Boone, Sr. ............ | F16K 1/2261 |
| | | | 251/306 |
| 3,228,653 A * | 1/1966 | Trimmer ............. | F16K 11/0525 |
| | | | 251/306 |
| 3,549,123 A | 12/1970 | Bell et al. | |
| 3,951,381 A | 4/1976 | Whitener | |
| 3,961,405 A | 6/1976 | Robinson | |
| 4,258,925 A | 3/1981 | Guyton | |
| 5,535,986 A | 7/1996 | Hutchens et al. | |
| 8,129,882 B2 | 3/2012 | Russberg et al. | |
| 8,191,861 B2 * | 6/2012 | Elsasser ................. | F02D 9/106 |
| | | | 251/306 |
| 10,281,048 B2 * | 5/2019 | Suhnel ................ | F16K 11/0873 |
| 2009/0050106 A1 | 2/2009 | Bessho | |
| 2015/0068228 A1 | 3/2015 | Sedlak et al. | |

FOREIGN PATENT DOCUMENTS

| | | |
|---|---|---|
| DE | 4321647 A1 | 1/1995 |
| DE | 19860637 A1 | 7/2000 |
| DE | 69615198 T2 | 7/2002 |
| DE | 102005031962 A1 | 1/2007 |
| DE | 102012208174 B4 | 11/2013 |
| JP | H06147334 A | 5/1994 |
| WO | 9702446 A1 | 1/1997 |
| WO | 2008118063 A1 | 10/2008 |

OTHER PUBLICATIONS

English Translation of the International Preliminary Report on Patentability; dated Mar. 3, 2020 from PCT/EP2018/072794.

* cited by examiner

FLUID SWITCHOVER DEVICE AND METHOD OF PRODUCING A FLUID SWITCHOVER DEVICE

CROSS-REFERENCES TO RELATED APPLICATIONS

This application is a continuation of copending International Application No. PCT/EP2018/072794, filed Aug. 23, 2018, which is incorporated herein by reference in its entirety, and additionally claims priority from German Application No. DE 10 2017 215 082.3, filed Aug. 29, 2017, which is incorporated herein by reference in its entirety.

The present invention relates to fluid switchover devices, and in particular to fluid switchover devices having at least three terminals/ports for implementing a switchover device, for gases or liquids between two or more ways.

BACKGROUND OF THE INVENTION

Fluid switchover devices may be implemented, e.g., on the basis of a ball valve. Conventional technology has known alternative implementations of fluid switchover devices.

For example, DE4321647 A1 describes a switch valve for a pressure medium, which comprises a one-piece plate-shaped housing, the cylindrical housing space of which has a cylindrical slider pivotally arranged therein. The housing has an annular slot formed therein into which has at least one input and at least one output lead. The annular slot has a seal ring arranged therein which—in a position where a flattened area at the slider bridges an input and an adjacent output—is pressed against said flattened area, whereby a bridging space is formed between the outer bounding surface of the annular slot and the seal ring. The sole seal ring serves to seal the inputs and the outputs from one another and to seal the valve toward the outside.

WO2008118063 A1 discloses a directional valve comprising a rotating actuator which has an elliptical shape and is mounted to an axis.

DE19860637 A1 discloses a manifold valve comprising a cylindrical housing and a seal plate which is attached to a groove and divides the cylinder into at least two subspaces. The plate is arranged in an oblique manner, has the shape of an ellipse and is provided, at its circumference, with a slot which has an O ring mounted therein.

U.S. Pat. No. 3,951,381 discloses disc bodies, each of which has a slot along its peripheral surface. The slot has an O ring inserted therein.

DE102005031962 A1 discloses a manifold valve for heating and/or warm water systems which comprises a valve housing, said valve housing comprising inflows and outflows. The valve housing has a rotary disc valve arranged therein which is rotatably mounted within the valve housing and comprises control openings on its circumference. As a function of the position of the rotary disc valve, the inflows and outflows can be connected to and/or separated from one another. In addition, the valve housing has a hollow-mold insert arranged therein in a torque-proof manner, which has the rotatory disc valve slidably mounted therein.

Depending on the implementation, manufacturing of the switchover devices known from conventional technology involves a large amount of expenditure and is very costly since they meet very high demands that might be needed. Other switchover devices, in turn, involve less expenditure in terms of production but are not sufficiently pressure-tight.

SUMMARY

According to an embodiment, a fluid switchover device may have: a housing including at least three ports leading into an interior space; a valve flap including a rotational axis, the valve flap being rotatably arranged within the housing, and the rotational axis being mounted to the housing at a first location and being mounted to the housing at a second location; and a circumferential seal mounted to the valve flap and including a first evasion portion at the first location and a second evasion portion at the second location, the first evasion portion and the second evasion portion being configured to evade the rotational axis on the same side of the valve flap, and wherein the valve flap is configured to slidingly engage a boundary of the interior space by means of the circumferential seal, so that at a first position of the valve flap, the first port is connected to the second port and the first port is sealed off from the third port, and so that in a second position of the valve flap, the first port is connected to the third port and the first port is sealed off from the second port.

According to another embodiment, a method of producing a housing including at least three ports leading into an interior space, and a valve flap including a rotational axis, the valve flap being rotatably arranged within the housing, and the rotational axis being mounted to the housing at a first location and being mounted to the housing at a second location, may have the steps of: mounting a circumferential seal to the valve flap, said circumferential seal including a first evasion portion at the first location and a second evasion portion at the second location, the first evasion portion and the second evasion portion being configured to evade the rotational axis on the same side of the valve flap, and inserting the valve flap into the interior space, so that the valve flap slidingly engages a boundary of the interior space by means of the circumferential seal, so that at a first position of the valve flap, the first port is connected to the second port and the first port is sealed off from the third port, and so that in a second position of the valve flap, the first port is connected to the third port and the first port is sealed off from the second port.

The fluid switchover device includes a housing comprising at least three ports leading into an interior space. Moreover, a valve flap is provided which comprises a rotational axis, the valve flap being rotatably arranged within the housing, and the rotational axis being mounted to the housing at a first location and being additionally mounted to the housing at a second location. Furthermore, the valve flap has a circumferential seal mounted thereto which comprises a first evasion portion at the first location and a second evasion portion at the second location, the first evasion portion and the second evasion portion being configured to evade the rotational axis on the same side of the valve flap. In addition, the valve flap is configured so as to slidingly engage the boundary of the interior space by means of the circumferential seal, so that at a first position of the valve flap, a first output is connected to a second output and the first output is sealed off from a third output, and so that in a second position, the first output is connected to the third output and the first output is sealed off from the second output.

The circumferential seal, which slidingly engages in a boundary of the interior space, ensures that—irrespective of the position of the valve flap—sealing will be provided between a first area of the interior space, into which two ports lead, and a second area of the interior space into which the at least one port and advantageously the other two ports lead, when the fluid switchover device is configured as a two-way switch having four ports. For example, in an implementation comprising three ports, one input may be coupled to two outputs in a fluid-tight manner, for example, or one output may be coupled to two inputs in a fluid-tight manner.

The circumferential seal ensures that the two flow paths are separated. In order for the seal to separate one flow path from the other flow path in a tight manner, it evades at the two evasion portions of the rotational axis on the same flow side, i.e., in relation to the same side of the valve flap, and thus presents a circumferential seal in both switch positions.

Advantageously, the fluid switchover device of the present invention serves to switch over liquid flows in a situation involving negative pressure, i.e., typically within a coarse vacuum as exists when a heat pump is considered which is operated with water as the heat pump medium, as described, e.g., in DE102012208174 B4, where two-way switches are employed so as to switch between a normal heat pump mode and a free-cooling mode.

In addition, the present invention is advantageous in that when two inputs are switched over to two outputs by swapping over the inputs or outputs, vacuum tightness with regard to the surrounding air pressure is nevertheless maintained, and where a flow tightness of the two volume flows is achieved which might not always exist 100%, but which achieves a flow tightness higher than 10 ml per minute of leakiness.

Advantageously, the present invention employs a valve flap provided with the circumferential seal which is configured as a standard O ring. This circumferential seal separates the flow space on the one side of the valve flap from a flow space on the other side of the valve flap while acting in a self-centering manner. The valve flap further is rotatably mounted so as to be rotated, depending on the implementation, by approx. 90 degrees if need be so as to thereby connect a different output to an input and/or a different input to an output.

In advantageous embodiments, a fluid switchover device is obtained which involves no specific molded seal that would be expensive to produce, but wherein all of the seals can be implemented as common O-ring seals which can be produced at low cost while being reliable in operation.

Moreover, the valve flap is guided via the rotational axis, specifically via the attachment at the first and second locations. In addition, simplicity of the design is achieved in that a structural concept is provided wherein a maximum level of similarity of the parts is strived for both with regard to the housing and with regard to the individual components of the multi-component valve flap.

In addition, wear and tear is avoided in that precisely where the circumferential seal slidingly engages in the interior space, only obtuse angles are present which are produced by specific chamfers. The O-ring seal, which is arranged at the valve flap in a circumferential manner and evades at the two serving portions of the rotational axis, enables the self-centering concept. Both flow spaces are obtained by guiding the O-ring seal past the source on the same side in each case while using the two evasion portions. In this manner, leakage via the shaft that is passed through within the flow space is avoided independently of the positon of the valve flap in relation to the interior space.

The present invention is applicable not only as a switchover device in connection with the heat pump described, for switching over from a normal mode to a free-cooling mode or to another mode of the heat pump, but the present invention may be used for any applications where there are at least three and advantageously four ports, and where there are, in particular, two inputs and two outputs, and where fluid flows may be switched between sources and sinks; the sources and sinks may be liquid sources or gas sources and/or liquid sinks or gas sinks.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
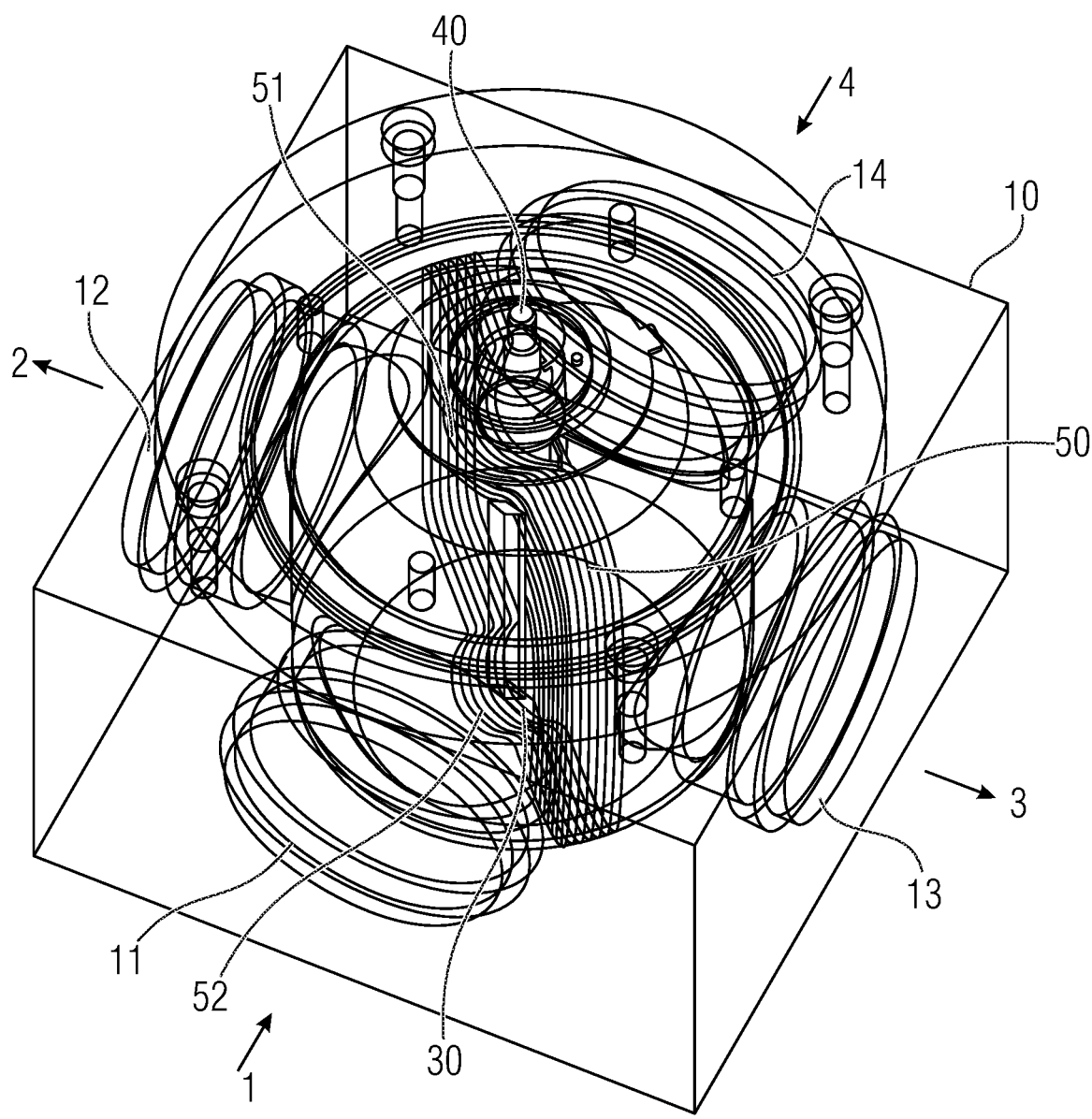
FIG. 1 shows a schematic three-dimensional view of a fluid switchover device in accordance with an embodiment.
Figure 1:
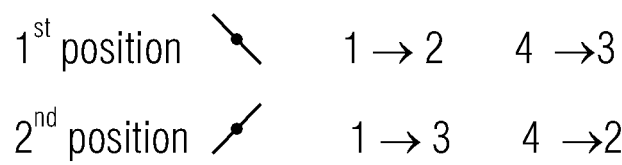

FIG. 1 shows a fluid switchover device comprising a housing 10 having at least three ports 11, 12, 13, 14. In particular, in the embodiment shown in FIG. 1, the first port 11 is an input 1, and the second port 12 is an output 2. Moreover, the third port 13 is an output 3, and the fourth port 14 is an input 4. In the position, shown in FIG. 1, of a valve flap 30, the first input 11 is connected to the first output 12, and the second input 14 is connected to the third port 13. In a second position of the valve flap 30, to which the valve flap may be brought, e.g., by a servomotor or by manual operation or by an actuator device of any kind, the first port 11 as the first input would be connected to the third port 13 as the first output, and the second input 14 would be connected to the second output 12.

The fluid switchover device might also be configured as a 3-port switchover device, however, so as to connect, e.g., in the position shown in FIG. 1, the first input 1 to the first output 2, or to port 12, and to connect, in the second position, the first input 1, or port 11, to the second output 3, or port 13. Thus, it would be with only three ports that a switchover device would be implemented for connecting an input to either a first output or a second output.

Likewise, the switchover device might also be used for connecting an output to either a first input or to a second output.

Figure 3:
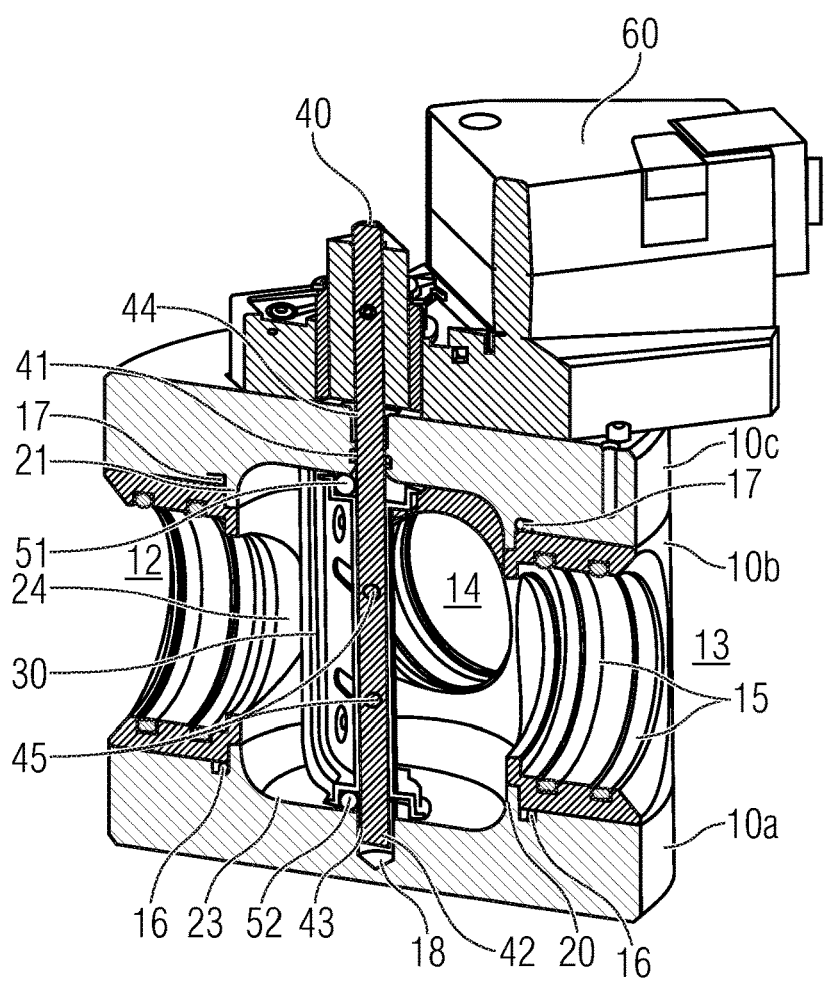
FIG. 3 shows a sectional view of the fluid switchover device of FIG. 2.

In particular, the valve flap 30 is provided with the rotational axis 40, wherein the valve flap is rotatably arranged within the housing 10, and wherein the rotational axis 40 is mounted to the housing 10 at a first location 41 (in FIG. 3), and is also mounted to the housing 10 at a second location (42 in FIG. 3). Moreover, the valve flap 30 is provided with a circumferential seal 50 mounted to the valve flap 30 and configured to slideably engage a boundary of the interior space, so that the connections of the inputs/outputs may be achieved, as is depicted at the bottom of FIG. 1. At the first location 41 (FIG. 3), the seal has a first evasion portion 51, and at the second location 42 (FIG. 3), it has a second evasion portion 52, the first evasion portion and the second evasion portion being configured to evade the rotational axis 40 on the same side in relation to the valve flap, i.e., on the left-hand side in the position shown in FIG. 1.

Both the first evasion portion 51 and the second evasion portion 52 therefore extend, with regard to the view in FIG. 1, on the same side rather than in such a manner that, e.g., the first evasion portion 51 would extend to the left of the shaft in FIG. 1, and the second evasion portion would extend to the right of the shaft. Said very implementation is avoided because this would mean that further seal of the shaft might be used in order to seal the first flow space off from the second flow space. However, said further seal may be avoided in accordance with the invention, specifically by arranging the circumferential seal in a non-symmetrical manner, in which seal the two evasion portions evade on the same side of the rotational axis 40, while a continuously circumferential seal is nevertheless provided.

Figure 2:
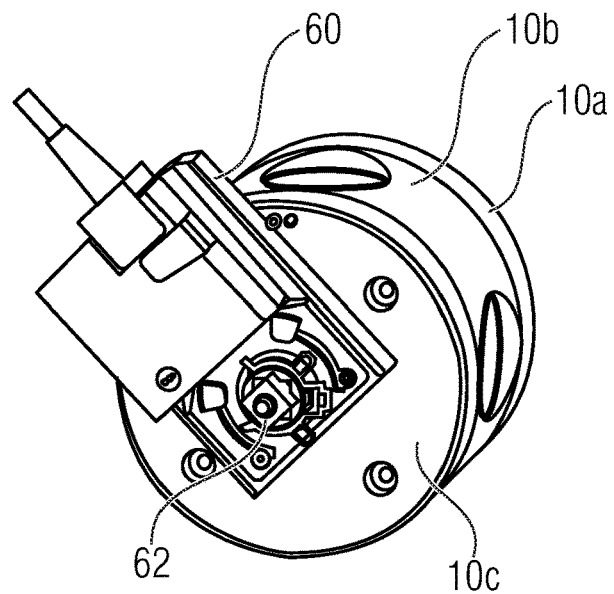
FIG. 2 shows a top view of a fluid switchover device in accordance with an embodiment.

FIG. 2 shows a schematic view of the fluid switchover device in accordance with an advantageous embodiment of the present invention, wherein the fluid switchover device as shown in FIG. 1 is configured as a two-way switch.

A driving device 60 and/or an operating device is provided which is configured to apply a torque to the rotational axis 40. In addition, FIG. 2 shows that the entire fluid switchover device may be implemented by three parts, namely a bottom part, or a lower side 10a, an insert, or spacer, 10b, and a lid, or an upper side 10c. Advantageously, the lid 10c and the bottom 10a are configured as identical parts; however, as shown in FIG. 3, the lid 10c has a through hole 19, which is shown in more detail also in FIG. 4, while the bottom 10a comprises a blind hole 18. Apart from that, the lid 10c and the bottom 10a, or the upper side and the lower side, are configured as identical parts.

As shown in FIG. 2, transmission of the torque from the operator 60 to the shaft takes place by means of a screw head 62. However, in an alternative embodiment, the drive may be twisted by 45 degrees with regard to the representation in FIG. 2; as a result, countersinking of the connecting screws will be dispensed with, and torque transmission can also take place. Depending on the implementation, the drive may be configured as an electrical, mechanical, fluidic or pneumatic drive so as to twist the valve flap with regard to the interior space, so as to achieve either the first position or the second position of the valve flap with regard to the interior space, as is schematically depicted in FIG. 1.

FIG. 3 shows a cross section of the fluid switchover device of FIG. 2, in which the left port 12 is shown on the left-hand side in FIG. 3, and the right port 13 is shown in FIG. 3, as is the rear port 14. However, in the section shown in FIG. 3, the front port 11 is "cut off", as it were.

In addition, the valve flap 30 is depicted which has the rotational axis 40 contained therein. Moreover, the two evasion portions 51, 52 are shown, which in the embodiment shown in FIG. 3 evade on the left, or on the left-hand side of the valve flap of the rotational axis 40 in the view shown in FIG. 3, and both of which extend on the same side, in relation to the rotational axis, on the valve flap.

Moreover, it is shown that the lower side 10a is sealed off from the middle part and/or the insert 10b via an O ring 16. Thus, the O ring provides the seal between the lower side 10a and the insert 10b, and the inner contours of the lower side 10a and of the insert 10b as well as of the upper side 10c form the interior space wherein the valve flap 30 is rotated and wherein the circumferential seal slidingly engages when the rotational axis 40 is operated. The O ring 16 is mounted around a projection 20. In particular, the projection 20 with a corresponding, almost positive-fitting slot forms a stable and tight connection with the insert 10b, specifically as a negative pressure prevails within the switch and, therefore, the atmospheric pressure from outside presses the middle part 10b onto the projection 20. A corresponding design is also present at the upper part, where a projection 21 is also formed to which a slot of the middle part 10b is pressed, in turn, due to the atmospheric pressure when the switch advantageously exhibits a negative pressure within the interior space. However, if the switch does not exhibit any negative pressure within the interior space, the positive-fitting stable connection may also be achieved in that the screws or other fastening means are provided accordingly.

In addition, the middle part includes, within each port, two slots, each of which has an O ring mounted therein. Said double seal 15 enables a simple pipe connection. One has to merely insert a pipe into the port, and in this manner, tightness is achieved, in particular also due to the fact that negative pressure advantageously prevails within the switch and, therefore, also in the connecting leads.

In addition, the rotational axis 40, or shaft, is configured as a simple rotational part having two to three bores 45 for alignment pins so as to achieve torque transmission to the valve flap 30, as will be illustrated in more detail below with reference to FIG. 5. In particular, at its top the rotational axis 40 is provided with an edged outer profile, e.g., a three-edged wedge, a four-edged wedge or, e.g., a six-edged wedge so as to achieve a stable mechanical and positive-fitting torque transmission to the rotational axis.

The circumferential seal 50 comprising the two evasion portions 51, 52 is advantageously configured as an O ring, is positioned on one side in a circumferential manner and therefore completely seals off the flow space.

Furthermore, the contour of the interior space is provided with rounded-off corners 23. Said circumferentially rounded seal contour 23 allows using a standard O ring as the circumferential seal and enables a valve flap that is self-centering, as it were, since the valve flap 30 slidingly engages the circumferentially rounded seal contour, i.e., the upper side of the interior space. In addition, a chamfer 24 is provided at each of the mouths of the ports so as to achieve smooth, obtuse transition during switchover, which transition leads to a minimum load on the O ring, even if the valve flap 30 is moved relatively fast in order to move from the first position to the second position and vice versa. Specifically, in such a movement, the valve flap sweeps over said chamfer while being hardly or not at all abraded, however, because of the gentle/obtuse angle.

Figure 4:
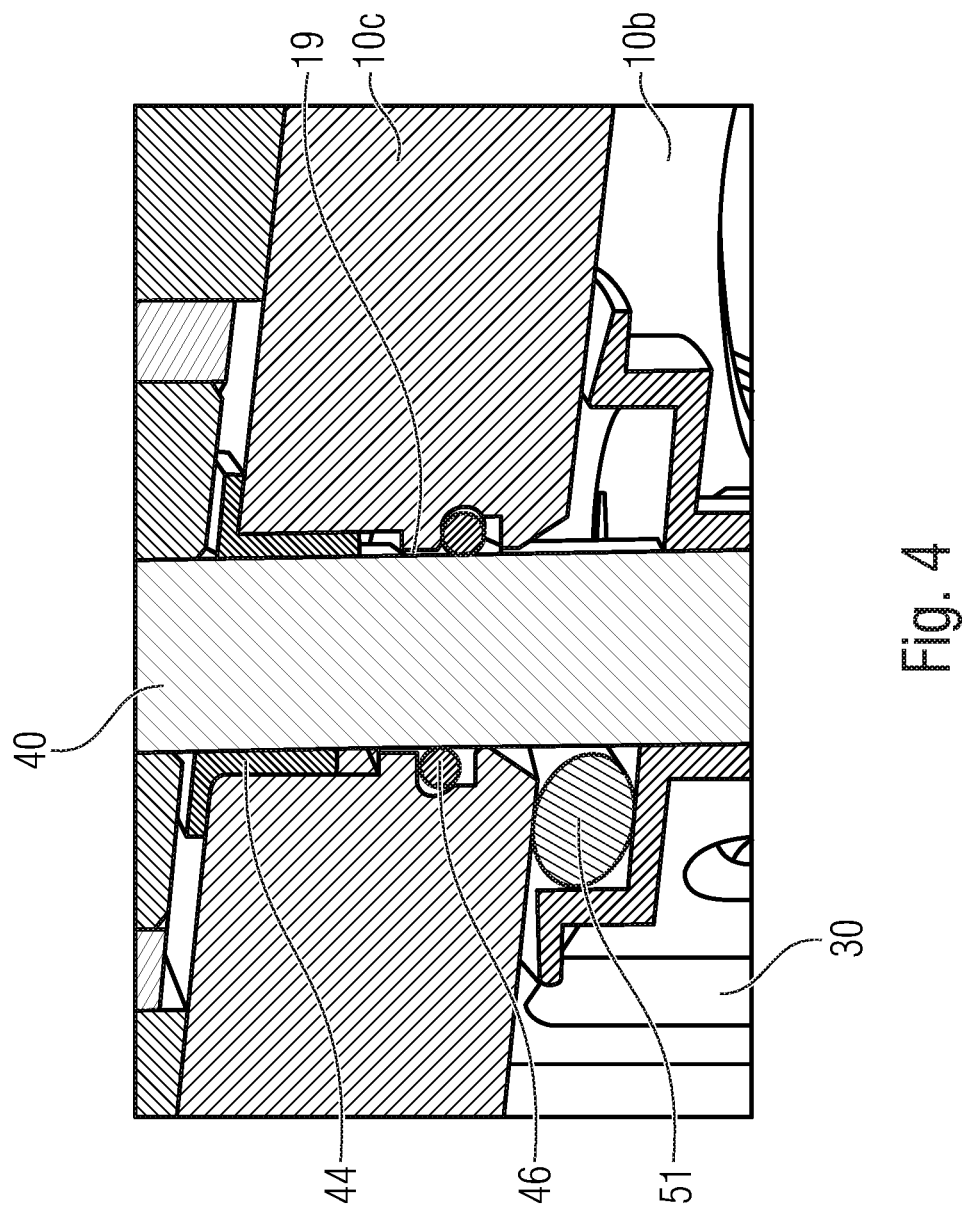
FIG. 4 shows a detailed representation of the upper location where the rotational axis is mounted, the evasion portion being brought out, in particular.

FIG. 4 shows a more detailed section of the upper portion and/or of the location 41 of the rotational axis 40. In particular, the rotational axis 40 is passed through the upper area 10c through the through hole 19, said upper area 10c resting on the central area and/or the insert 10b. The upper evasion portion 51 of the circumferential seal arranged at the valve flap 30 abuts the lower surface of the upper side 10c, which forms the interior-space contour, and thus seals off the one flow space from the other flow space. Moreover, an O ring 46 is contained within an O ring enclosure in the upper side 10 so as to seal off the rotational axis 40 towards the outside. Furthermore, the rotational axis 40 is mounted on the upper side 10c as a slide bearing via a flange bushing 44. Thus, the valve flap 30 is radially and axially self-centered because of the circumferential seal and seals of the two flow spaces from each other.

It shall further be noted that a flange bushing as a slide bearing is provided not only at the first location 41 but also at the second location 42, as shown at 43 in FIG. 3.

It can be seen from FIGS. 2, 3 and 4 that all of the seals are configured as common, inexpensive O-ring seals that are easy to produce, so that no specific molded seals have to be designed and employed. Instead, just standardized parts may be used.

Figure 5:
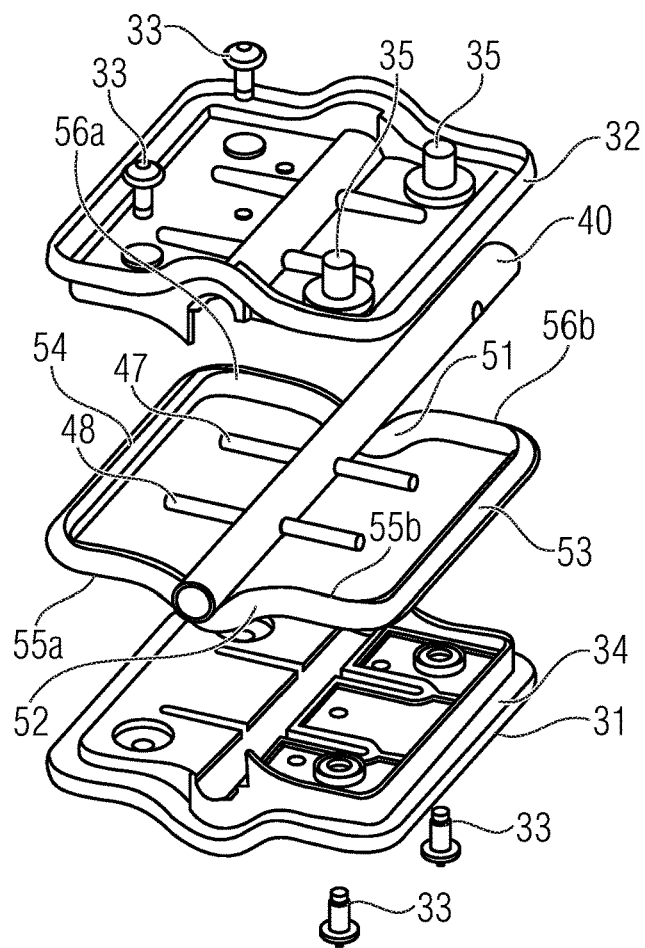
FIG. 5 shows an exploded view of an advantageous embodiment of the valve flap with identical parts for the upper side and the lower side.

FIG. 5 shows an exploded view of the valve flap. In particular, the valve flap consists of a lower part 31 and an upper part 32. Between same, the shaft 40 is arranged which is provided with two alignment pins 47, 48, which extend through the bores 45 for the alignment pins. Moreover, the two valve flap parts 31, 32 are screwed to each other by respective screws 33, the screw ends being tightly enclosed, as shown at 35. The valve flap thus is fluid-tight in itself. The circumferential seal 50 is inserted into a seal fastener portion 34 of a valve flap part, e.g., 31. Subsequently, the shaft comprising the alignment pins is placed on top, and finally, the upper part 32 is placed on top and connected thereto, e.g. by means of the screws. Alternatively or additionally, the two valve flap parts may also be bonded. At any rate, whenever screws are used, the screw ends will be tightly enclosed, as shown at 35.

Figure 6:
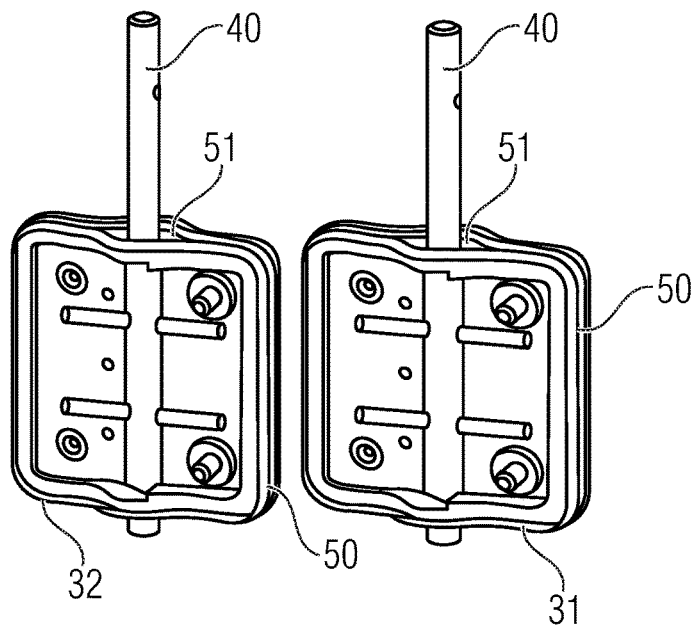
FIG. 6 shows a representation of two alternative modes of assembly for the valve flap.

In the embodiment shown in FIG. 5, the circumferential seal includes two long straight sides 53, 54, in each case two short straight sides 55a, 55b adjoining the second evasion portion 52, as well as two further short sides 56a, 56b adjoining the first evasion portion 51. In particular, the short straight portions 55b, 56b are connected to the one long straight portion 53 of the circumferential seal, and the other short straight portions 55a, 56a are connected to the other straight long portion 54 of the circumferential seal. Thus, one achieves a valve flap which has a flat shape and bears, at its front sides, i.e., the small side surfaces, the O-ring seal and/or the circumferential seal, the two evasion portions 51, 52 evading the axis on the same side with regard to the axis or with regard to the valve flap, respectively. To this end, the two valve flap parts 31, 32 each have a seal guide for the evasion portion; however, the circumferential seal extends only within the corresponding evasion portion of a valve flap part, whereas the guides for the evasion portions of the other part of the valve flap are not passed through by the circumferential seal. This can be clearly seen in FIG. 6, for example, where two different assembly variants are shown, namely, for one thing, that the two evasion portions extend on the lower side, i.e., on that side of the valve flap that is designated by 31, whereas on the right-hand side of FIG. 6, the two evasion portions extend on the other side of the valve flap, i.e., on that side which is designated by part 32 in FIG. 5. Both alternatives can be implemented equivalently.

This is advantageous in particular in that the valve flap advantageously consists of two equal parts 31, 32. In addition to bonding, the two parts may also be screwed to each other, as was already described, in which case the screw ends will be tightly enclosed.

The circumferential seal, which is advantageously configured as a circumferential O ring, usually moves around the shaft on the same side so as to safely separate both flow spaces reliably from each other and, in particular, so as not to enable, in particular, any leakage via the shaft. The only sealing of the shaft is effected toward its surroundings, specifically through the O ring 46, whereas no sealing of the shaft is required at the bottom because the hole 18 is merely a blind hole and because therefore, the lower part 10a already provides sufficient sealing toward the outside since the blind hole 18 enables no communication with the external surroundings.

As was already depicted, torque transmission takes place via the two alignment pins 47, 48 inserted into the valve flap. However, any alternative torque transmissions may be achieved, for example corresponding slots or the like so as to achieve reliable force transmission from the rotational axis 40 to the valve flap.

In alternative embodiments, the valve flap may thus also be directly injection-molded onto/around the shaft. The O ring slot and/or the fastener 34 for the circumferential seal would then be implemented by means of slider technology within the tool.

Figure 7:
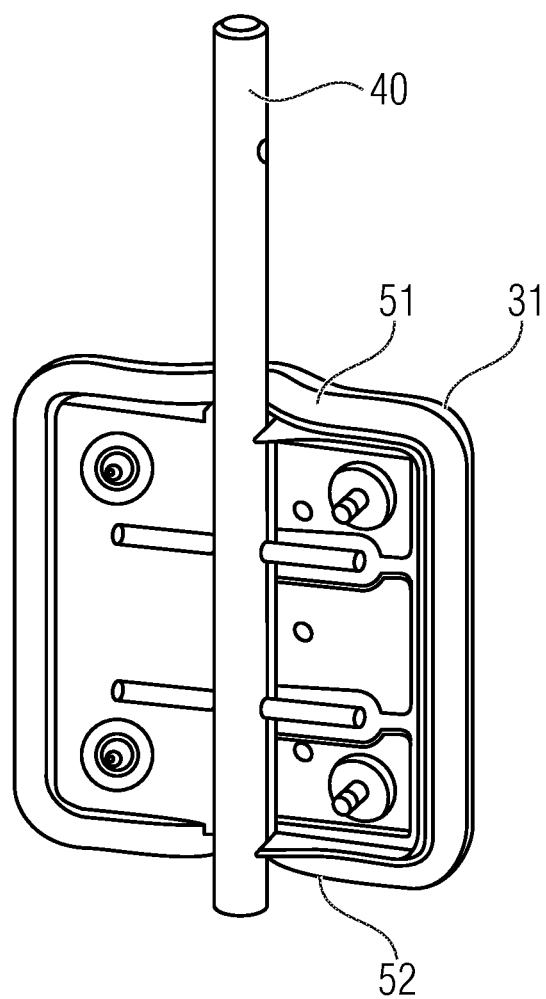
FIG. 7 shows a situation of assembling the valve flap before the second valve flap part is connected to the first valve flap part; however, wherein the circumferential seal and the shaft have been inserted by means of alignment pins.

FIG. 7 shows an intermediate state in assembling the valve flap, wherein the shaft 40 has already been placed onto the valve part 31 by means of the two alignment pins 47, 48. In particular, the shaft has been placed on by means of the alignment pins once the circumferential seal 50 has been inserted, by means of the two evasion portions 51, 52, into the corresponding slot 34 of the part 31.

Figure 8:
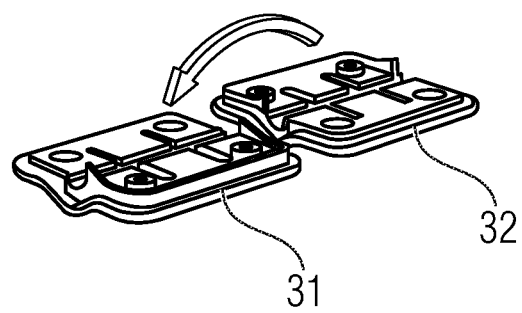
FIG. 8 shows a schematic representation of a possible assembly of the two valve flap parts.

In order to complete the valve flap, one will then only have to place, as shown in FIG. 8, the upper part 32 onto the arrangement shown in FIG. 7, and to screw and/or to bond the parts to one another.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:
1. A fluid switchover device comprising:
   a housing comprising at least three ports leading into an interior space of the housing, the at least three ports comprising a first port, a second port, and a third port;
   a valve flap comprising a rotatable shaft, the valve flap being rotatably arranged within the housing, and the rotatable shaft being rotatably mounted to the housing at a first location and being rotatably mounted to the housing at a second location; and
   a circumferential seal mounted to the valve flap and comprising a first evasion portion at the first location and a second evasion portion at the second location, the first evasion portion and the second evasion portion being configured to evade the rotatable shaft on the same side of the valve flap, and wherein the valve flap is configured to slidingly engage a boundary of the interior space of the housing by means of the circumferential seal, so that at a first position of the valve flap, the first port is connected to the second port and the first port is sealed off from the third port, and so that in a second position of the valve flap, the first port is connected to the third port and the first port is sealed off from the second port,
   wherein the circumferential seal is an O ring held within an O ring holding portion of the valve flap and projecting beyond the valve flap so as to slidingly engage the interior space of the housing, the O ring having an O shaped cross section, and wherein the valve flap comprises a first valve flap part and a separate second valve flap part, wherein the circumferential seal is continuously in contact with the first valve flap part, wherein the rotatable shaft is arranged between the first valve flap part and the second valve flap part, and wherein the second valve flap part is not in contact with the circumferential seal at the first evasion portion and the second evasion portion of the circumferential seal.

2. The fluid switchover device as claimed in claim 1, wherein the valve flap comprises a first flat side and a second flat side, wherein the first evasion portion and the second evasion portion extend either on the first flat side or on the second flat side.

3. The fluid switchover device as claimed in claim 1, wherein the valve flap comprises a face side, the circumferential seal being mounted on the face side of the valve flap.

4. The fluid switchover device as claimed in claim 1, wherein the rotatable shaft extends centrally within the valve flap, so that an area of the valve flap between the first location and an edge of the interior space of the housing between a first pair of ports comprising two ports of the at least three ports is identical to an area of the valve flap between the first location and an edge of the interior space of the housing between a second pair of ports comprising two ports of the at least three ports, wherein, in the second pair of ports, at least one port differs from the two ports of the first pair of ports.

5. The fluid switchover device as claimed in claim 1, wherein the valve flap exhibits a flat shape and four face sides extending between a front side of the valve flap and a back side of the valve flap, the rotational axis projecting from a first face side and from a second face side, wherein the circumferential seal comprises one straight portion on each of the third and fourth face sides of the valve flap, wherein the first evasion portion and the second evasion portion being mounted on the first and second face sides and being connected to the straight portion on the third and fourth face sides, respectively, via a respectively straight portion.

6. The fluid switchover device as claimed in claim 1, wherein the first valve flap part is screwed by one or more screws or bonded to the second valve flap part, and the rotatable shaft is received between the first valve flap part and the second valve flap part, wherein screw ends of the one or more screws are sealed off, or wherein the rotatable shaft has at least one alignment pin connected thereto which is attached to the rotatable shaft or extends through a bore within the rotatable shaft, the at least one alignment pin being arranged between the first valve flap part and the second valve flap part.

7. The fluid switchover device as claimed in claim 1, which is configured as a two-way switch, in which the at least three ports comprise four ports, the four ports being arranged such that in the first position of the valve flap, the first port is connected to the second port and the third port is connected to the fourth port, and so that in the second position of the valve flap, the first port is connected to the third port and the second port is connected to the fourth port.

8. The fluid switchover device as claimed in claim 7, wherein the interior space of the housing is cylindrical and the four ports are arranged within the housing in such a manner as to lead into the interior space of the housing, wherein an angle of from 70 degrees to 110 degrees exists between two mouth centers of two adjacent ports of the four ports.

9. The fluid switchover device as claimed in claim 1, wherein the rotatable shaft extends through the housing at the first location and is sealed off from the surroundings of the fluid switchover device by a seal, and wherein the rotatable shaft does not extend through the housing at the second location but is held within the housing via a blind hole.

10. The fluid switchover device as claimed in claim 1, comprising an actuator device so as to actuate the rotatable shaft as a function of a control signal so as to rotate the valve flap between the first position and the second position.

11. The fluid switchover device as claimed in claim 1, wherein the housing comprises an insert sealed off from an upper side of the housing by an O-ring seal, or sealed off from a lower side of the housing by an O-ring seal, the insert for a port of the at least three ports comprising a double O-ring seal so as to keep a pipe, which adjoins the port of the at least three ports, in a liquid-tight state.

12. The fluid switchover device as claimed in claim 1, wherein the housing comprises a lower side, an upper side, and an insert, wherein the insert has the at least three ports formed therein, and wherein the insert between the upper side and the lower side defines, together with the upper side and the lower side, the interior space of the housing, a mouth of a port of the at least three ports within the insert being provided with one chamfer, respectively, so that any wear and tear that might be caused by the sliding engagement at the circumferential seal is reduced or eliminated.

13. The fluid switchover device as claimed in claim 11, wherein the lower side comprises a blind hole for receiving the rotatable shaft at the second location, wherein the upper side comprises a through hole for receiving the rotatable shaft at the first location.

14. The fluid switchover device as claimed in claim 1, wherein the valve flap is formed of plastic, wherein the rotatable shaft is formed of metal, and wherein the circumferential seal is formed of a rubber material.

15. The fluid switchover device as claimed in claim 1, wherein the rotatable shaft is mounted by a first slide bearing at the first location and is mounted by a second slide bearing at the second location, the first slide bearing or the second slide bearing being formed as flange bushings, and an O-ring seal being formed between the circumferential seal and surroundings so as to seal off the interior space of the housing from the surroundings.

16. A method of producing a housing comprising at least three ports leading into an interior space of the housing, the at least three ports comprising a first port, a second port, and a third port, and a valve flap comprising a rotatable shaft, the valve flap being rotatably arranged within the housing, and the rotatable shaft being rotatably mounted to the housing at a first location and being rotatably mounted to the housing at a second location, the method comprising:

mounting a circumferential seal to the valve flap, said circumferential seal comprising a first evasion portion at the first location and a second evasion portion at the second location, the first evasion portion and the second evasion portion being configured to evade the rotatable shaft on the same side of the valve flap, and inserting the valve flap into the interior space of the housing, so that the valve flap slidingly engages a boundary of the interior space of the housing by means of the circumferential seal, so that at a first position of the valve flap, the first port is connected to the second port and the first port is sealed off from the third port, and so that in a second position of the valve flap, the first port is connected to the third port and the first port is sealed off from the second port, wherein the circumferential seal is an O ring held within an O ring holding portion of the valve flap and projecting beyond the valve flap so as to slidingly engage the interior space of the housing, the O ring having an O shaped cross section, and wherein the valve flap comprises a first valve flap part and a separate second valve flap part, wherein the circumferential seal is continuously in contact with the first valve flap part, wherein the rotatable shaft is arranged between the first valve flap part and the second valve flap part, and wherein the second valve flap part is not in contact with the circumferential seal at the first evasion portion and the second evasion portion of the circumferential seal.

* * * * *